Feb. 15, 1966    M. G. MAY    3,234,924
PROCESS AND APPARATUS FOR REDUCING THE
AMOUNT OF INCOMPLETELY BURNED PRODUCTS
OF COMBUSTION IN THE EXHAUST GASES OF
INTERNAL COMBUSTION ENGINES
Filed July 11, 1963    6 Sheets-Sheet 1

Inventor:
Michael May
by
Michael S. Striker

Inventor:
Michael May
by Michael J. Striker

Feb. 15, 1966 M. G. MAY 3,234,924
PROCESS AND APPARATUS FOR REDUCING THE
AMOUNT OF INCOMPLETELY BURNED PRODUCTS
OF COMBUSTION IN THE EXHAUST GASES OF
INTERNAL COMBUSTION ENGINES
Filed July 11, 1963 6 Sheets-Sheet 5

Inventor:
Michael May
by Michael J. Striker
Atty

Feb. 15, 1966   M. G. MAY   3,234,924
PROCESS AND APPARATUS FOR REDUCING THE
AMOUNT OF INCOMPLETELY BURNED PRODUCTS
OF COMBUSTION IN THE EXHAUST GASES OF
INTERNAL COMBUSTION ENGINES
Filed July 11, 1963   6 Sheets-Sheet 6
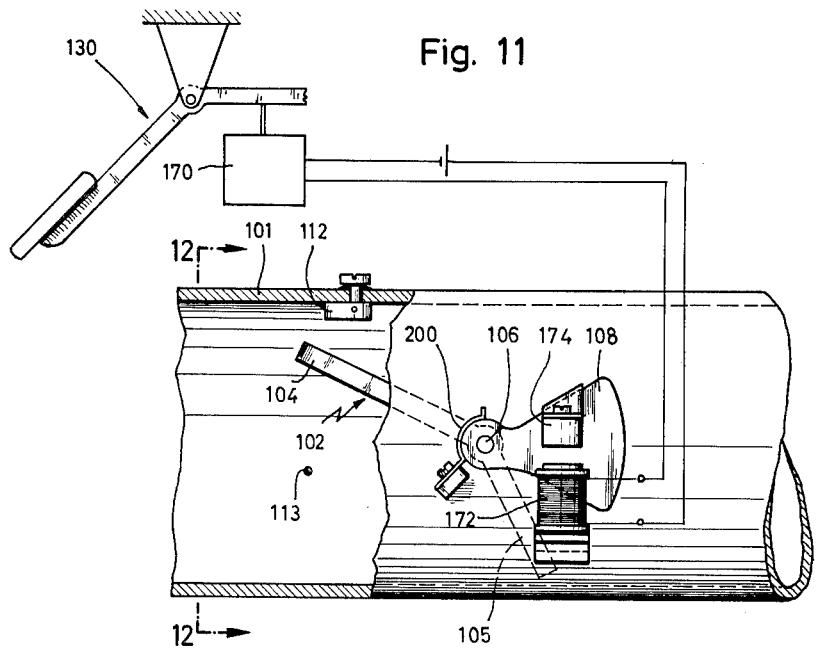
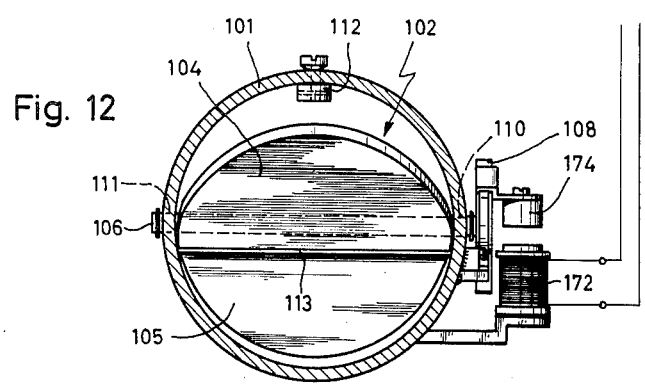
Inventor:
Michael May
by Michael J. Striker United States Patent Office
3,234,924
Patented Feb. 15, 1966

3,234,924
PROCESS AND APPARATUS FOR REDUCING THE AMOUNT OF INCOMPLETELY BURNED PRODUCTS OF COMBUSTION IN THE EXHAUST GASES OF INTERNAL COMBUSTION ENGINES
Michael G. May, Kreuzstrasse 25, Kilchberg-Zurich, Switzerland
Filed July 11, 1963, Ser. No. 294,453
Claims priority, application Austria, July 12, 1962, A 5,643/62; Germany, Jan. 30, 1963, M 55,607
11 Claims. (Cl. 123—97)

The present invention relates to internal combustion engines. In particular, the present invention relates to that type of internal combustion engine in which ignition of the combustion mixture takes place artificially through spark plugs or the like. While the invention is applicable to two-stroke internal combustion engines, it is primarily intended for four-stroke internal combustion engines.

As is well known, the manner in which the combustible mixture of such an engine is burned depends upon a number of variables. Thus, it is known that when the engine is operating at a relatively low load, as when idling, the combustion is almost invariably incomplete. As a result, when the engine of an internal combustion engine is idling the exhaust gases thereof contain a very high percentage of incompletely burned or completely unburned hydrocarbons and derivatives thereof, in particular the toxic carbon monoxide, and in addition such exhaust gases have a foul odor. Such incompletely burned exhaust gases occur, however, not only during idling of an internal combustion engine, but also, in general, when the engine is excessively cooled, as when operating at only a relatively small fraction of its full load and when the engine while being coupled to the vehicle attempts to decelerate the latter or when in other words the engine has the effect of a brake and exerts so to speak a negative load. For example, assuming that the engine forms part of a vehicle, when the engine is coupled to the vehicle by the clutch thereof so as to transmit its drive to the vehicle, but when the coupled engine is not accelerated by depression of the accelerator of the vehicle, then in such a case there is also an extremely high percentage of incompletely burned components in the exhaust gases. Thus, such exhaust gases are very frequently encountered in relatively slow city traffic. The annoyance as well as the danger to health which results to the populations of large cities from this incomplete combustion of the mixture of such engines has already been cause for great concern and attempts have already been made to reduce or eliminate these conditions. Thus, it is clear that it is important to provide a more complete combustion of the combustible products under low-load operating conditions as described above, and for this purpose there has already been provided an after-burner structure which burns the gases subsequent to their flow from the combustion chambers of the engine, and in addition filters have been provided in the path of flow of the exhaust gases to clean the latter. However, such after-burners or filters, while they are indeed capable of producing relatively good results, nevertheless are in general so expensive to manufacture and maintain as well as so large and unwieldy to incorporate into the known structures that they had proved to be undesirable, and an additional disadvantage of these devices is that they are very slow to operate. For example, they must be preheated up to approximately 200° C. in order to start operating properly.

It is accordingly a primary object of the present invention to provide a process and apparatus capable of overcoming the above drawbacks while at the same time reliably reducing the extent to which incompletely burned products of combustion flow out of the exhaust pipe with the exhaust gases especially under no load and/or low-load operating conditions as described above.

It is also an object of the present invention to provide a process and apparatus while while capable of substantially reducing the extent to which the exhaust gases with unburned components therein are discharged to the atmosphere under low-load operating conditions nevertheless will provide substantially no influence on the operation of the internal combustion engine when the latter operates at higher loads during which substantially complete combustion takes place so that the use of special structures for reducing the extent of unburned components in the exhaust gases is not called for.

Still another object of the present invention is to provide a process and apparatus which will automatically retard the flow of exhaust gases to the atmosphere under low-load operating conditions of an internal combustion engine while automatically eliminating any throttling or retarding of the exhaust gases at loads above a predetermined low-load range.

It is furthermore an object of the present invention to provide a process and apparatus where the throttling and release of the exhaust gas is controlled not only by the pressure of the gas itself but also according to other operating characteristics such as, for example, the extent of vacuum in the intake manifold or suction conduit of the engine, the temperature of the exhaust gases, the position in which the power-output controlling structure of the engine is placed by the operator, etc.

Furthermore, it is an object of the present invention to provide a structure which will guarantee that the resistance to flow of the exhaust gases out of the exhaust pipe of the engine is substantially eliminated when the power-controlling structure of the engine is set to provide a power output substantially higher than the low-load conditions referred to above.

Still another object of the present invention is to provide a structure capable of electrically and magnetically controlling the flow of the exhaust gases out of the exhaust pipe.

Also, the objects of the present invention include the provision of exceedingly simple structures for automatically controlling an internal combustion engine so that it will reduce the extent to which unburned products of combustion flow out of the engine with the exhaust gases.

With the above objects in view the invention includes, in a process for operating an internal combustion engine capable of operating from no load to full load and having an exhaust pipe through which the exhaust gas is discharged, the step of throttling the flow of the exhaust gases through the exhaust pipe in a relatively low operating range extending from no load up to a relatively small load which is a fraction of the full load of the engine, while providing minimum or substantially no throttling of the exhaust gases at loads greater than the relatively small load at the upper end of the low-load range. The structure of the invention includes, in an internal combustion engine, an exhaust pipe which is provided with a throttling means for throttling the flow of the exhaust gases therethrough, and this throttling means of the invention is automatically controlled, in accordance with the present invention by a control means which provides throttling of the exhaust gases only when the engine operates in a relatively low operating range extending from no load up to a relatively small load which is but a fraction of the full load of the engine, so that with the process and apparatus of the invention the throttling of the exhaust gases takes place only under low-load operating conditions such as idling, operating under partial, relatively small loads, and operating a vehicle, for example, where the engine is coupled to the vehicle to drive the same but where there is very little or no acceleration of the vehicle by the operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 11 and 12 show a further embodiment of the invention.

Figure 1:
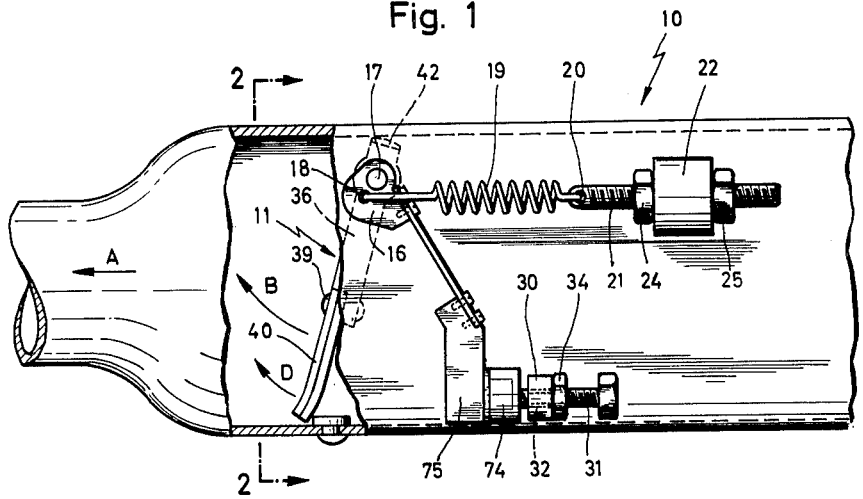
FIG. 1 is a fragmentary partly sectional side elevation of an exhaust pipe of an internal combustion engine provided with the structure of the invention.

Referring now to FIG. 1, there is shown therein a portion of an exhaust pipe 10 through which exhaust gases flow from an unillustrated internal combustion engine, the gases flowing out of the combustion chambers of the internal combustion engine and through the exhaust pipe 10 in the direction of the arrow A shown in FIG. 1. Within the exhaust pipe 10 is located a throttling means 11 in the form of a valve plate fixedly carried by a shaft 13 which is spaced from the central axis of the pipe 10 and which extends beyond the valve plate into openings 14 and 15 in the walls of the pipe 10 so that in this way the valve is supported for turning movement about the axis of the shaft 13. One end of the shaft 13 is extended to include a flanged portion 17 which is fixed to a lever 16 which forms part of a lever means for controlling the movement of the throttling means 11. The lever 16 is formed with an opening 18 to which one end of a spring 19 is attached, and the other end of the spring 19 is hooked into an opening 20 of a screw 21 which is threadedly carried in a threaded bore of a projection 22 fixed to and extending from the exterior surface of the pipe 10. A pair of nuts 24 and 25 are threaded onto the screw 21 and engage the ends of the support 22 for the screw 21 so that in this way the axial position of the screw 21 is fixed, and of course the nuts 24 and 25 can be backed away from the support 22 to enable the screw 21 to be turned so as to change its axial position and thus regulate the tension of the spring 19. The spring 19 and the lever 16 form a lever means which is rendered adjustable by way of the screw 21, and this lever means urges the throttle means 11 to turn in a counterclockwise direction, as viewed in FIG. 1, and the turning of the valve by the spring 19 is limited by an adjustable screw 31 threaded through the threaded bore 32 of a support 30 which is also fixed to the exterior surface of the pipe 10, a lock nut 34 being provided for maintaining the stop screw 31 in its adjusted position. An element 74 is shown in the illustrated example carried by the screw 31 and engaged by an element 75 which is fixed by a leaf spring to the lever 16 so that in this way the engagement of element 75 with the element 74 limits the extent of turning of the valve by the spring 19, although it is to be understood that any projection of the lever 16 may cooperate with an element such as the screw 31 for adjustably limiting the extent of turning of the throttle valve by the spring 19, and in this way it is possible to determine the extent to which the interior of the pipe 10 is closed by the throttle valve 11 when the latter is in a fully-closed position determined by adjustment of the screw 31. The leaf spring in the connection between element 16 and 75 serves as a damping means for reducing vibrations of the valve 11. The throttle valve means 11 is made up of a plate 36 which is fixed directly to the shaft 13 and to which a bimetallic throttle plate 40 is fixed, as by the rivets 39, so that with this bimetallic construction a temperature-sensitive control is provided in a manner described below.

The structure is shown in FIG. 1 where the throttle valve means 11 is in the limit of its position determined by the stop screw 31, and in this position the throttle valve means has its fully-closed condition. This position can of course be regulated by adjustment of the screw 31. However, in order to prevent a complete closing of the pipe 10 the plate 39 is formed at its top edge with a notch 42 (FIG. 2) so that a relatively small amount of gases can escape no matter to what extent the pipe 10 is closed by the valve 11.

The exhaust gases which flow into the pipe 10 in the direction of the arrow A engage the right face of the plate 36, as viewed in FIG. 1, and exert on the plate 36 a force tending to turn the plate 36 in the direction of the arrow B. Because of the fact that the axis of the shaft 13 is displaced from the center of the pipe 10, this force of the exhaust gases engaging the plate 36 will act through a moment arm on the plate 36 to tend to turn the latter in the direction of the arrow B opening the throttle valve means. In accordance with the extent of tension provided in the spring 19 by the screw 21 and the moment arm provided for the force of the spring 19 by the lever 16 the tendency of the valve to be opened by the exhaust gases is opposed by the lever means 16, 19. Thus, when the force of the exhaust gases on the plate 36 is sufficiently great to overcome the force of the lever means the throttle valve means will be automatically opened by the exhaust gases and the throttle valve means can turn to a fully opened position where the lever means 16, 19 provides a lesser force tending to close the throttle valve than in the position shown in FIG. 1, and in its fully open position the valve is also limited in its turning in a clockwise direction, as viewed in FIG. 1, and provides practically no obstruction to the flow of exhaust gases out of the exhaust pipe. The force of the spring 19 and the moment arm provided through the lever 16 are so arranged that in the idling condition of the engine the throttle valve is in the fully closed position shown in FIG. 1 and opens as soon as the motor operates in a low-load operating region, the valve opening as the load increases and becoming fully open at a relatively small load which is a fraction of the full load operating condition of the engine, so that the throttling means will automatically provide through the control afforded by the lever means 16, 19 a throttling of the exhaust gases only in a low-load range extending from no load up to a relatively small load which is only a fraction of the full load. Inasmuch as the throttling action is desirably diminished as the load increases the turning moment of the structure is so designed that the moment arm through which the spring 19 acts on the valve 11 to return it to its closed position diminishes as the valve turns toward its fully open position, and the structure may be so diminished that the moment arm through which the spring 19 acts on the valve plate 36 continuously diminishes from the fully closed position toward the fully open position. It will be seen from FIG. 1 that as the valve 11 turns in the direction of the arrow B the point 18 at which the spring 19 is connected to the lever 16 approaches the axis of the shaft 13 so that the moment arm is in fact diminishing continuously as the valve continues to open. When the valve means 11 is in its fully open position the spring 19 extends along and exerts its force along a line extending between the points 18 and 20, and this line is very close to but just below the axis of the shaft 13 in the fully open position of the valve so that the spring 19 does not move through the over-center position and always acts to return the valve toward its closed position. Thus, in the fully open position the return force provided by the spring 19 is almost zero but is still sufficient so that if the load should sharply diminish or if the engine should be returned to its idling condition or should simply be turned off then the force will be sufficient to return the valve 11 to its closed position. Thus, with this construction the discharge of exhaust gases to the outer atmosphere is very greatly retarded in a low-load operating range where the exhaust gases are likely to contain a relatively large amount of unburned products of combustion. The blocking of the discharge of the exhaust gases under these conditions promotes a more complete burning so as to reduce the extent of unburned products of combustion in the exhaust gases.

It is also possible to sharply reduce the force with which the throttle valve means is urged back toward its closed position during an increasing load on the motor by way of a magnetic structure exerting a magnetic force, and in the example of FIG. 1 the element 74 is a magnet which acts on a cooperating magnetic element 75 which carries a non-magnetic layer of material preventing direct engagement between the magnetic elements 74 and 75, and the leaf spring which connects the element 75 to the lever 16 damps vibrations of the lever 16, as pointed out above. Thus, with this construction in the region of the closed position of the valve the elements 74 and 75 will provide a magnetic force which increases the extent to which the valve is urged toward its closed position while when the valve has been displaced through an appreciable distance away from its closed position the force exerted by the magnetic elements 74 and 75 will be sharply reduced so as to enhance the operation according to which the return force acting on the throttle valve means reduces sharply with an increase in load.

Figure 2:
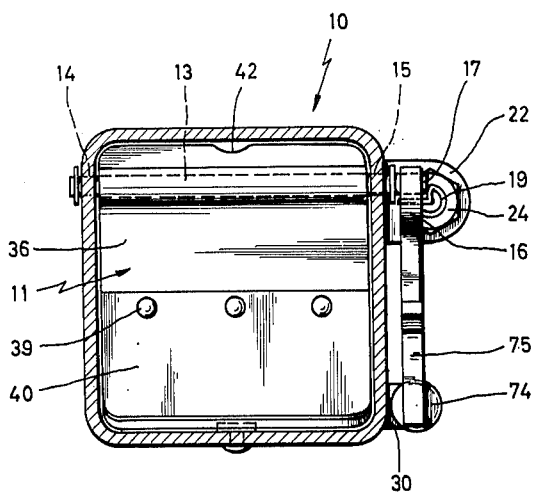
FIG. 2 is a transverse sectional view of the structure of FIG. 1 taken along line 2—2 of FIG. 1 in the direction of the arrow.

Inasmuch as in many cases the temperature of the exhaust gases is a suitable measure for controlling the flow of the products of combustion by throttling the exhaust gases, the structure of FIGS. 1 and 2 includes the bimetallic plate 40 which controls, partially, the extent of throttling in accordance with the temperature of the exhaust gases. With increasing temperatures of the exhaust gases the bimetallic structure acts to turn the lower edge portion of the valve 11 in the direction of the arrow D, so that particularly in the closed position of the throttle valve means the throttling action will be regulated according to the temperature of the exhaust gases. Thus, with this embodiment the control of the throttling is such that in the fully closed position of the throttle valve the throttling action becomes smaller as the temperature of the bimetallic throttle plate portion increases. Such a control of the counterpressure acting on the exhaust gases in accordance with the temperature thereof has proved in many cases to be highly desirable for controlling the combustion of the engine when it is idling or when it is operating in a low-load range.

Figure 3:
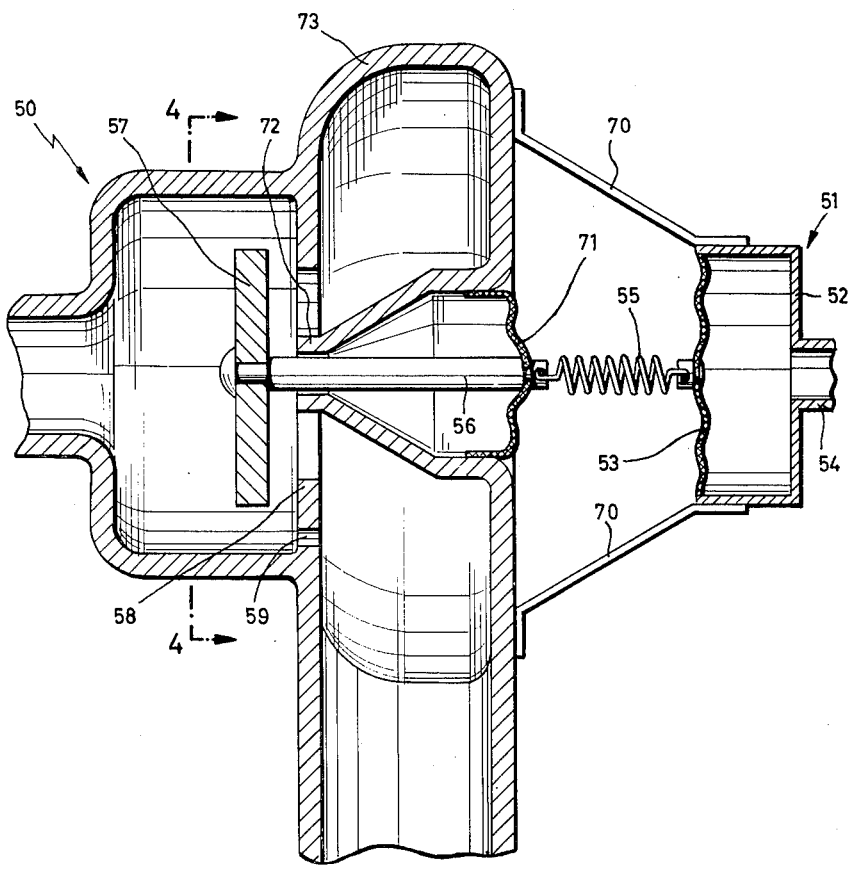
FIG. 3 is a longitudinal, fragmentary sectional elevation of another embodiment of the invention shown mounted on an exhaust pipe of an internal combustion engine and cooperating therewith to throttle the flow of the exhaust gases in a controlled manner.
Figure 4:
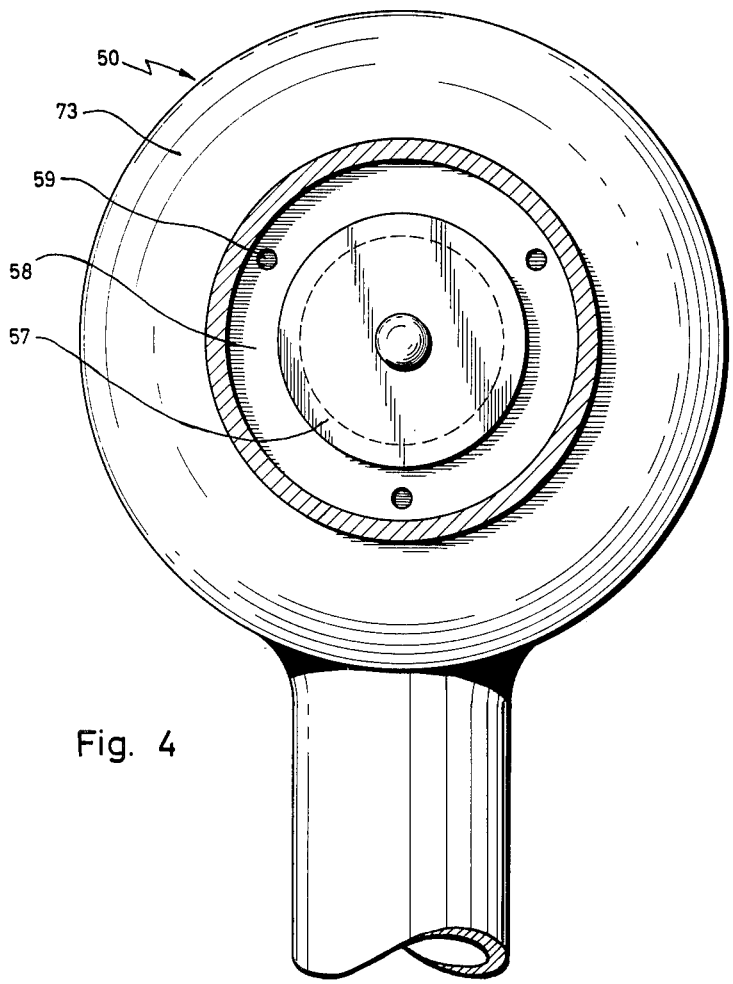
FIG. 4 is a transverse sectional view of the structure of FIG. 3 taken along line 4—4 of FIG. 3 in the direction of the arrow.

In the embodiment of the invention which is illustrated in FIGS. 3 and 4, the exhaust gases discharge through an exhaust pipe 50 to which there is fixed, by way of struts 70, a vacuum chamber 51 shown at the right portion of FIG. 3. This vacuum chamber 51 includes a housing 52 closed by a flexible membrane or diaphragm 53 in a fluid-tight manner. The membrane or diaphragm 71 serves to fluid-tightly close the exhaust pipe 50 and also serves to support the bar 56 which is connected by a spring 55 to the diaphragm 53 of the vacuum chamber 51. The left end of the bar 56, as viewed in FIG. 3, fixedly carries the throttle plate 57 so that the assembly 56, 57 forms the throttle valve means of the embodiment of FIGS. 3 and 4. The bar 56 is guided for movement in a bearing portion 72 which is formed integrally with the wall 73 of the exhaust pipe 50. The vacuum chamber 51 is connected by way of a tube 54 with the unillustrated suction conduit system of the internal combustion engine. In other words the interior of the vacuum chamber 51 is placed in communication with the interior of the intake manifold of the engine through the conduit 54, so that in this way the pressure within the vacuum chamber 51 will be determined in accordance with the vacuum prevailing in the intake or suction conduit of the engine. The extent of vacuum in the intake manifold will thus act through the diaphragm 53 and the spring 55 on the bar 56 for determining the position of the throttle plate 57. The throttle plate 57 can be drawn to the right, as viewed in FIG. 3, all the way up to the cooperating valve plate 58 which is formed with the openings through which the exhaust gases flow and which are fully closed by the plate 57. Instead of a plurality of openings the structure can include, as shown in FIGS. 3 and 4, a circular opening into which the bearing portion 72 extends concentrically so that a relatively large passage is provided for the exhaust gases when the valve 57 is in its open position. In order to guarantee that the flow of exhaust gases out through the exhaust pipe is never fully closed the wall 58 is formed with a plurality of small openings 59 located along a circle whose diameter is greater than that of the valve plate 57 and which is concentric with the latter, so that in this way the exhaust gases can to at least a small extent always escape through the openings 59, as is particularly apparent from FIG. 4. The arrangement of the throttle valve means 56, 57 and the vacuum chamber means 51 is such that the pressure of the exhaust gases in this embodiment also acts on the valve plate 57 to urge the latter to an open position permitting the exhaust gases to discharge, so that the throttling of the exhaust gases is determined on the one hand by the extent of vacuum in the intake system of the engine and on the other hand by the pressure of the exhaust gas itself acting on the plate 57 to displace the latter away from the plate 58 to the left, as viewed in FIG. 3. Thus, when a relatively great extent of vacuum prevails in the intake manifold, which is to say the pressure therein is extremely low, the force urging the valve 57 to its closed position will be greater than when there is very little extent of vacuum in the intake manifold, and in addition as the pressure of the exhaust gas itself increases the tendency of the throttle valve means to open is also increased, so that with this embodiment also the blocking of the exhaust gases in a fully automatic manner under low-load conditions is guaranteed while practically no throttling is provided when operating in a range from a relatively small load all the way up to full load.

Figure 5:
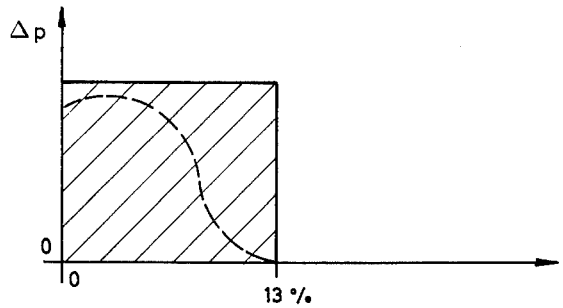
FIG. 5 is a graph illustrating one possible operating characteristic to be used in connection with the throttling pressure in the exhaust pipe.

It is thus apparent that with the invention it is possible to control the discharge of the exhaust gases not only according to the pressure of the exhaust gas itself but also according to an additional operating characteristic of the engine. Thus, in the case of FIGS. 1 and 2 this additional operating characteristic is the temperature of the exhaust gas while in the embodiment of FIGS. 3 and 4 the additional operating characteristic is the pressure prevailing in the suction conduit of the engine. FIGS. 5–8 graphically illustrate the manner in which the discharge of the exhaust gases can be controlled according to different operating characteristics of the engine, and the shaded areas of FIGS. 5 and 8 showing the preferred operating ranges for the throttle valve means, it being understood, of course, that these operating ranges are not in fact so sharply defined as illustrated in FIGS. 5–8. In FIG. 5 there is shown in dotted lines a preferred operating curve for this embodiment. In all of FIGS. 5–8 the ordinate $\Delta p$ indicates the pressure with which the throttle valve means of the invention opposes the discharge of the exhaust gases while the abscissa of each of FIGS. 5–8 illustrates the particular operating characteristic which is the independent variable of which the pressure $\Delta p$ is a function.

Thus, referring to FIG. 5 it will be seen that the pressure $\Delta p$ with which the throttle valve means resists the flow of exhaust gases through the exhaust pipe is illustrated as a function of the free, unobstructed cross-sectional area of the suction conduit or intake manifold of the engine. As is well known, the extent of vacuum in the intake manifold of a conventional internal combustion engine is controlled by the angular tilting of a butterfly valve, for example, and when this valve is in its fully closed position there will be a maximum degree of vacuum while the valve can be turned to a fully open position where there is practically no obstruction to the cross section of the path along which the gas is sucked into the engine and in this position this cross section would be fully open. As is illustrated in FIG. 5 the counterpressure provided by the throttle valve means is maintained in the region from the fully closed position of the intake of the engine where its cross sectional area is practically entirely obstructed to the position where it is only uncovered or opened to an extent of 13%, so that 87% of the cross sectional area of the suction conduit of the internal combustion engine is still obstructed while 13% is uncovered when the throttle valve means is in its fully open position with the operation illustrated in FIG. 5. Therefore, as long as the cross section of the suction conduit of the engine is open to an extent of 13% or more the throttle valve means will have no influence while in the low-load range where a substantial vacuum prevails and the extent to which the cross section of the suction conduit of the engine is opened is 13% or less there will indeed be a blocking at least to some extent of the discharge of the exhaust gases by the throttling means of the invention as indicated in FIG. 5. The minimum pressure $\Delta p$ with an arrangement as shown in FIG. 5 is preferably on the order of 0.14–2.86 pounds/inch², preferably in the range of 0.72–2.12 pounds/inch², and especially 1.4 pounds/inch², while the maximum counterpressure $\Delta p$ can advantageously be in the region of 2.12–4.29 pounds/inch², in particular approximately 3.58 and in many cases also up to 7.2 pounds/inch², while in special cases this maximum pressure can be 21.5 pounds/inch².

Figure 6:
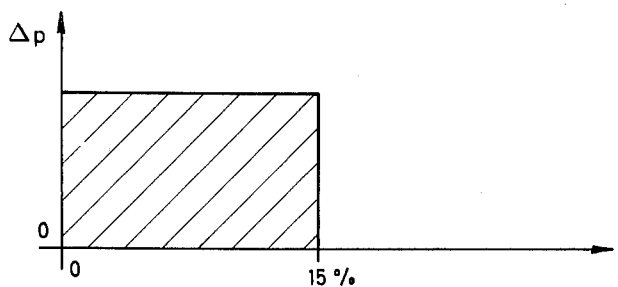
FIG. 6 is a graphical illustration of another operating characteristic of the engine capable of being used in connection with the throttling pressure in the exhaust pipe.

FIG. 6 shows the counterpressure provided by the throttle valve means plotted as a function of the extent of admission of a combustible mixture into the chambers of the engine in percent of maximum admission (when the intake valve is fully open), and it will be seen that the preferable range of operation of the throttle valve means is when the combustion chamber of each cylinder is filled from zero to 15% with a combustible mixture, while when the chamber is filled to a greater extent the throttle valve means will no longer have any influence.

Figure 7:
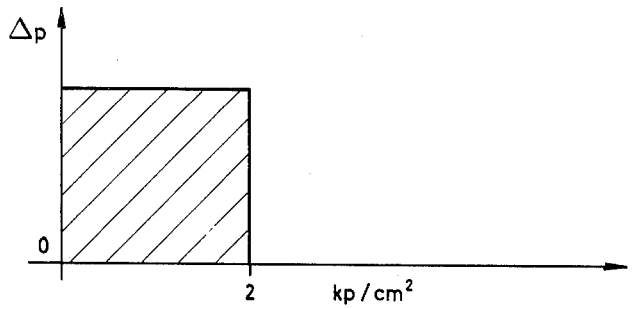
FIG. 7 is a graphical illustration of still another operating characteristic of the engine capable of being used in connection with the throttling pressure provided in the exhaust pipe.
Figure 8:
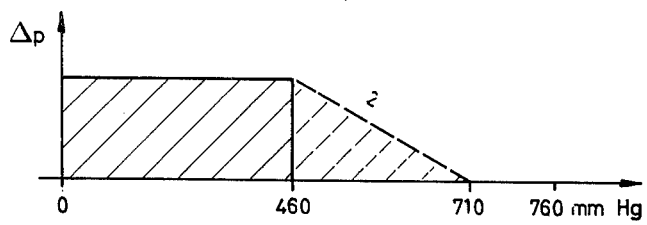
FIG. 8 shows a still further operating characteristic of the internal combustion engine capable of being used in connection with the throttling pressure for controlling the latter, FIG. 8 showing the operating characteristic both for a four-cycle engine and a two-cycle engine.

According to FIG. 7 the counterpressure is illustrated as a function of the main effective pressure in the combustion chambers of the engine with the preferred range of operation of the throttle valve means being provided only when the average pressure in the combustion chambers is from zero up to 28.6 pounds/inch².

FIG. 8 shows graphically the operation of the embodiment of FIGS. 3 and 4 according to which the counterpressure provided by the throttle valve means is a function of the extent of vacuum in the suction conduit of the engine, this extent of vacuum being illustrated in FIG. 8 in mm. of mercury, and it will be seen that for a four stroke engine the preferred range of operation of the throttle valve means will extend from a pressure of close to zero up to a pressure of 18.1 inch Hg in the intake manifold, while for a two-stroke engine the pressure in the intake manifold can increase up to 28.1 inch Hg, and at pressures beyond this point the throttle valve means will have no influence on the operation, while with the four stroke engines at pressures beyond 18.1 inch the throttle valve means will no longer have any influence on the operation.

Figure 9:
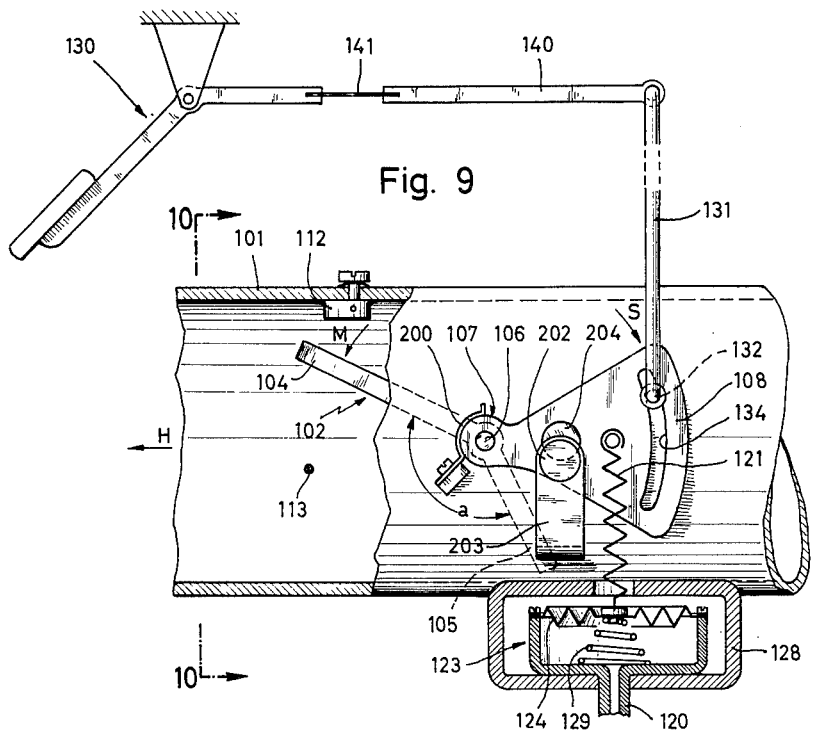
FIG. 9 is a partly diagrammatic, fragmentary, partly sectional side elevation of an exhaust pipe provided with yet another embodiment of a structure according to the present invention.
Figure 10:
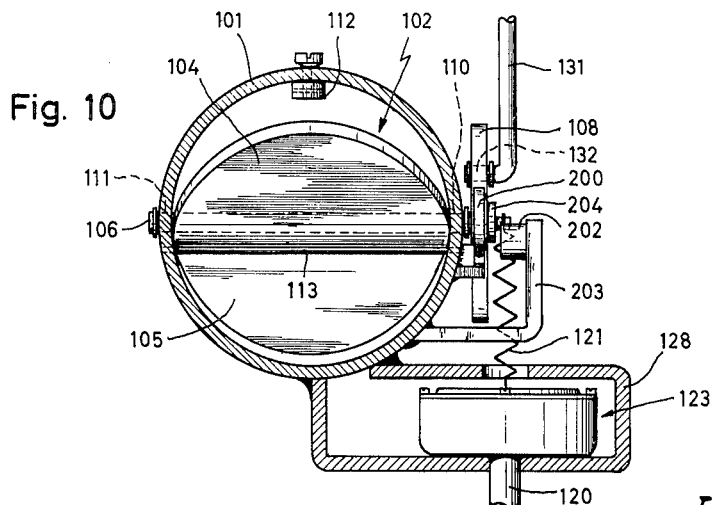
FIG. 10 is a transverse sectional view of a structure of FIG. 9 taken along line 10—10 of FIG. 9 in the direction of the arrows.

FIGS. 9 and 10 show a further embodiment of the invention according to which the exhaust gases flow out of the pipe 101 in the direction of the arrow H shown in FIG. 9. The exhaust pipe 101 has in its interior the throttle valve means or throttling means 102 which is in the form of a plate fixedly carried by a shaft 106 which extends across the exhaust pipe 101 and which extends into bearing openings 110 and 111 so that in this way the shaft 106 together with the throttle valve plate are supported for turning movement about the axis of the shaft 106. A spring 200, in the form of a leaf spring mounted at the exterior of the exhaust pipe on a suitable bracket frictionally bears against the circular peripheral portion 107 of a lever 108 which is fixed to the shaft 106 and which forms the lever means or part of the lever means of this embodiment, and thus the frictional engagement between the spring 200 and the peripheral edge portion 107 of the lever 108 provides a damping action which eliminates undesirable vibrations of the throttle valve means. The closed position of the throttle valve means is determined by a stop 112 carried by an upper wall portion of the exhaust pipe 101 and located in the path of clockwise turning movement of the valve 102 so as to engage the upper edge portion of the valve 102 and limit its clockwise turning to a position where the cross sectional area of the exhaust pipe 101 is substantially closed, and the open position of the valve means is determined by a rod 113 which is fixedly carried by the exhaust pipe 101 and extends across the interior thereof in the path of counterclockwise turning of the throttle valve 102 so as to limit this clockwise turning when the valve 102 reaches a position where it provides practically no obstruction to the flow of gases out of the exhaust pipe. In the closed position of the valve 102 and in the range of operation thereof in the immediate vicinity of the closed position a magnet 202 carried by a non-magnetic bracket 203 which is fixed to the pipe 101 acts on the lever 108 to urge the latter to turn in a clockwise direction, as viewed in FIG. 9, so that in the closed position of the throttle valve means 102 and in the immediate vicinity of this closed position when the valve 102 has started to open it is urged toward its closed position by the magnetic force of the magnet 202. The lever 108 itself is made of a non-magnetic material and carries an iron plate 204 which cooperates with the magnet 202. The throttle valve plate itself is made of a pair of portions 104 and 105 which extend at different angles from the turning axis of the throttle valve and which include between themselves the obtuse angle $a$, as illustrated in FIG. 9. The throttle valve plate portions 104 and 105 which thus extend from opposite sides of the turning axis 106 are arranged so as to provide different effective areas which are acted upon by the pressure of the exhaust gas to provide different turning moments of the throttle valve with respect to the turning axis thereof provided by the shaft 106. These moments may be determined according to the integral $$\int_F x\,dF$$

where $dF$ is an element of the area of a plate portion, $x$ is the distance of each individual area from the turning axis, and $F$ is the total area of the plate portion 104 or 105.

As a result of the unequal magnitudes of the moments exerted by the throttle plate portions 104 and 105, the pressure of the exhaust gas which tends to flow through the pipe 101 in the direction of the arrow H provides on the throttle valve a resultant opening force acting in the direction of the arrow M shown at the upper portion of FIG. 9.

This opening turning moment M is opposed by a vacuum chamber 123 which communicates with the unillustrated intake manifold of the engine or suction conduit thereof through the pipe 120 shown at the lower portions of FIGS. 9 and 10, the vacuum chamber 123 carrying, as its upper wall, the flexible diaphragm 124 which is engaged at its underside by a substantially conical coil spring 129 arranged as shown particularly in FIG. 9. The spring 121 interconnects the diaphragm 124 with the lever 108 so that the extent of vacuum in the suction conduit of the internal combustion engine will act through the vacuum chamber assembly 123 and the spring 121 on the lever 108 to urge the latter to turn in a clockwise direction tending to close the throttle valve means. Thus, the extent of vacuum in the suction conduit of the internal combustion engine will act on the lever 108 to tend to turn the latter in the direction of the arrow S, while the force of the exhaust gas will tend to turn the throttle valve in the direction of the arrow M, and of course these forces are in opposition to each other. The greater the extent of vacuum in the suction conduit of the engine, the greater will be the force exerted through the lever means which forms the control means of FIG. 9 to tend to close the throttle valve means, so that the force tending to close the throttle valve means is particularly great in relatively low-load operating ranges. In the low-load range the engine may be simply idling or it may be operating under a particularly small load, and in addition where the engine is part of a vehicle it may be coupled to the vehicle through the clutch thereof but the operator has not yet depressed the accelerator so that this simple connection of the engine to the vehicle to tend to drive the same without any acceleration by the operator will also provide a low-load operating condition where the throttling means will provide substantial throttling of the flow of exhaust gases from the engine. The spring 129 provides a predetermined pre-stressing of the diaphragm 124 of the vacuum chamber assembly 123 which is carried by the supporting bracket 128 which is fixed to the exhaust pipe 101 in the manner shown most clearly in FIG. 10.

In order to guarantee that the throttling action of the exhaust gases will be at a minimum at a range from a relatively small load all the way up to full load, the structure can include a linkage or the like which will positively place the throttle valve means in its fully open position whenever an assembly such as the structure which controls the power output of the invention has been actuated by the operator in such a way as to provide a load in a range from the relatively small load which is at the top end of the low-load range all the way up to full-load. Thus, as is shown diagrammatically in FIG. 9, the accelerator pedal 130 which forms the means for controlling the power output of the engine is connected in the manner illustrated schematically in FIG. 10 to the link 131 which has a free end 132 extending into an arcuate slot 134 formed in the lever 108 and extending along a circle whose center is in the turning axis provided by the shaft 106. The arrangement is such that when the control 130 has been moved by the operator to a position corresponding to the relatively small load which is at the top of the low-load range the link 131 will have engaged the lever means 108 to have placed the latter in the position where the throttle valve means is fully open and with this construction the throttle valve means will remain in its fully open position during the continued depression of the lever 130 by the operator to provide loads extending from the relatively small load all the way up to the relatively full load operating condition, so that a positive mechanical structure will guarantee that the throttling valve will not provide any opposition to the flow of the exhaust gases when operating at loads greater than the relatively small load at the top end of the low-load range referred to above. Thus, the rod 131 is suspended from one end of a bar 140 fixed to one end of a leaf spring 141 whose opposite end is fixed to the lever 130 so that when the latter has been moved from its rest position to a position providing the relatively small load referred to above, the link 131 will have displaced upwardly through a distance sufficient to locate the throttle valve means in its fully open position, whereas during continued turning of the accelerator pedal 130 the element 131 will not move upwardly since the valve plate will have engaged the stop rod 113, and at this time the continued turning of the control member 130 will simply provide further deflection of the spring 141 without producing any further upward movement of the rod 131.

According to the invention it is in many cases desirable to control the throttling action of the throttle means at least partially in an electromagnetic manner, preferably in dependence on the power output of the engine, and in particular according to the position of the control element which controls the power output of the engine. Thus, the magnet 74 of FIG. 1 or the magnet 202 of FIGS. 9 and 10 can be constructed as an electromagnet 172 (FIG. 11 and 12) the exciting coil of which is supplied with current according to the power output of the engine, and in particular according to the position of the control element 130 which controls the power output. For this purpose, it is possible in an illustrated manner to connect the accelerator pedal 130 into the exciting circuit of the electromagnet by causing the power controlling element 130 to be connected to an on-off switch, or a step-switch and/or a potentiometer indicated by unit 170 in such a way that the exciting of the coil of the electromagnet ranges from a maximum value in a low-load operating range, in particular during idling or when the engine is connected to the vehicle to the clutch without the vehicle being accelerated, to a minimum excitation of the coil of the electromagnet, preferably no excitation thereof, when the power output controlling element 130 is in the position providing a relatively high power output corresponding to an operating range higher than the relatively small load and extending from the relatively small load referred to above up to the full load.

Also in accordance with the present invention it is desirable to control electromagnetically also the open position of the throttling means such as the throttling valve elements of FIGS. 1, 9 and 11. For this purpose, it is possible to provide an electromagnet (such as 172, FIGS. 11 and 12) which cooperates with the throttle valve plate and which is also controlled, for example, by a switch (such as 170) actuated by the accelerator pedal 130 or a similar power-output controlling element. The switch which is actuated by the power-output controlling element, such as the element 130 of FIG. 11, is connected into the circuit of the electromagnet in such a way that this electromagnet is always energized when the power-output controlling means provides a power-output corresponding to a load greater than the relatively small load at the upper end of the low-load range referred to above, so that as a result of the excitation of the electromagnet which cooperates with the throttle valve under these conditions, the throttle valve will be electromagnetically held in its open position and will be acted upon by a turning moment tending to turn to its open position as long as the operating range is above the relatively small load at the top end of the low-load range referred to above. The electromagnet which acts to hold the throttle valve means in and urge it to its open position can be identical with the electromagnet which holds and urges the throttle valve means to its closed position, and the opposite actions provided by these electromagnets (repelling and attraction of the throttle valve plate) can be brought about by changing the direction of flow of current in the exciting coil by means of a reversing switch, for example switch 170. Thus, a single electromagnet 172 can be used both for holding the throttle valve in its open position as well as holding it in its closed position and of course urging it to its open position and urging it to its closed position simply by causing the circuit which is actuated by the power-controlling element, such as the element 130 of FIG. 9, to change the direction of flow of current through the exciting coil of such a single electromagnet. With such an arrangement the electromagnet preferably cooperates with a corresponding permanent magnet 174 or correspondingly excited electromagnet which is mounted on the throttle valve plate itself.

It is therefore apparent that with the above-described process and apparatus of the present invention it becomes possible to sharply reduce the extent of unburned products of combustion which will be discharged to the outer atmosphere so that the damage to the health of the population of crowded cities, for example, is very sharply reduced, and in addition it is possible in many cases with the structure of the invention to improve the efficiency of the internal combustion engine at least in its low-load operating range. An increase in the power-output of the invention is not provided.

It has proved to be of advantage to adjust the supply of fuel in such a way that the ratio by weight of the air to the fuel which are sucked in to the engine is greater than 13.5, preferably 14–16. With the throttling control provided in dependence on the load of the motor, as described above, in the low-load operating range referred to above particularly good results are achieved without undesirably influencing in any way the power-output of the engine in its upper load range. As was indicated above, the control of the throttling action of the invention can be brought about at least partly in accordance with an operating characteristic of the engine, and such an operating characteristic may be one which is determined at least partly according to the load, such as, for example, the amount of air sucked into the engine in a given unit of time, the consumption of fuel for a given unit of time, the amount of exhaust gases in a given unit of time, or the speed of rotation of the engine. Such operating characteristics under some circumstances are only a relatively inaccurate measure of the prevailing load on the engine, since these characteristics may be functions of further variables. In order to increase the accuracy of the control, therefore, the control according to such operating characteristics may be used in combination with another variable so that the control is from an operating characteristic which is a function of at least a pair of variables. However, if such a suitable operating characteristic of the invention is not available, then it is possible to control the throttling action in accordance with a pair of operating characteristics, or even more than two operating characteristics. As was indicated above in connection with FIG. 9, the power-output controlling element 130 can be mechanically connected with the lever means which controls the throttle valve means to mechanically place the latter in its fully open position when the power-output is at a range corresponding to a load greater than the relatively small load at the upper end of the operating range desired for the throttle valve means, and while a purely mechanical construction is shown in FIG. 9 any other suitable construction may be used, and if required, it is possible to transmit the control to the throttling structure by way of a suitable power-amplifying assembly.

While various operating characteristics of the engine have been mentioned above as being capable of use for at least partially controlling the throttling means of the invention, it is of course to be understood that these various operating characteristics can be used in any desired combination.

It will be understood that each of the elements described above, or two or more together, may also find a useful application in other types of internal combustion engines differing from the types described above.

While the invention has been illustrated and described as embodied in controls for internal combustion engines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

Wherever the expression "no load" is used in the specification and the claims this term is to be understood as meaning "idling and/or negative load (breaking)." The term resistance to the flow of the exhaust gases as employed in the specification and claims includes the back pressure exerted by the throttling means.

Wat is claimed as new and desired to be secured by Letters Patent is:

1. In a process for operating an internal combustion engine capable of operating from no load to full load and having an exhaust pipe through which exhaust gases are discharged, the step of throttling the flow of exhaust gases through said exhaust pipe in a relatively low operating range extending between no load and a relatively low load which is a fraction of the full load operating condition, while providing no throttling of the exhaust gases at higher loads located beyond said operating range; and providing in said relatively low operating range a ratio by weight of air to fuel which is greater than 13.5 and which is in a range of 14–16.

2. In a process for operating an internal combustion engine capable of operating from no load to full load and having a suction conduit with a throttle valve therein as well as an exhaust pipe through which the exhaust gases discharge, the step of throttling the flow of exhaust gases through the exhaust pipe in a relatively low operating range from no load to a relatively small load which is a fraction of the full load while providing a minimum throttling at loads greater than said small load, and while controlling the extent of throttling according to the free section of the suction conduit provided by the throttle valve therein in a manner where the throttling of the exhaust gases in the exhaust pipe will occur in a range where the throttle valve and the suction conduit provides substantially full closing of the suction conduit to substantially 13% opening thereof while providing substantially no throttling of the exhaust gases when the cross sectional area of the suction conduit is uncovered by the throttle valve therein to an extent greater than substantially 13%.

3. In a process for operating an internal combustion engine capable of operating from no load to full load and having an exhaust pipe through which exhaust gases discharge as well as combustion chambers which are supplied to a predetermined extent with a fuel-air mixture, the step of throttling the flow of exhaust gases through the exhaust pipe in a relatively low operating range from no load to a relatively small load which is a fraction of the full load while providing a minimum throttling of the exhaust gases at loads greater than said small load and reducing the extent of throttling of the exhaust gases in said range as the ratio of pressure in the combustion chambers to pressure of surrounding atmospheric air increases up to an extent up to approximately 15% while providing substantially no throttling of the exhaust gases when said pressure ratio is greater than approximately 15%.

4. In an internal combustion engine, in combination, an exhaust pipe; throttling means located in said exhaust pipe for throttling the flow of exhaust gases therethrough, said throttling means including a tiltable valve plate turnable about an axis displaced from the center of the pipe; lever means operatively connected to said valve plate for resisting the turning thereof by the exhaust gases with a moment arm which provides substantial throttling by said plate in a relatively low operating range from no load up to a small load which is a fraction of the full load while providing a minimum throttling at loads greater than said small load and said lever means providing a moment arm urging said throttling plate to its maximum throttling position to a decreasing extent as the load increases from no load up to said small load, said lever means including an adjustable magnet.

5. In an internal combustion engine, in combination, an exhaust pipe; throttling means located in said exhaust pipe for throttling the flow of exhaust gases therethrough, said throttling means including a tiltable throttling plate having a pair of sections which include between themselves an obtuse angle from 120° to 150°; and control means operatively connected to said throttling means for automatically controlling the latter to provide substantial throttling of the exhaust gases in an operating range from no load up to a relatively small load which is a fraction of the full load of the engine while providing a minimum throttling at loads greater than said small loads.

6. In an internal combustion engine, in combination, an exhaust pipe; throttling means located in said exhaust pipe for throttling the flow of exhaust gases therethrough, said throttling means including a tiltable throttling plate having a pair of sections which include between themselves an obtuse angle from 120° to 150°; and control means operatively connected to said throttling means for automatically controlling the latter to provide substantial throttling of the exhaust gases in an operating range from no load up to a relatively small load which is a fraction of the full load of the engine while providing a minimum throttling at loads greater than said small loads, said plate being turnable about an axis extending substantially on the intersection between said portions of said plate and said portions of said plate having different effective areas directed to the exhaust gases for providing different turning moments on said plate, respectively, from the pressure exerted on said plate portions by the exhaust gases.

7. In an internal combustion engine, in combination, an exhaust pipe; throttling means located in said exhaust pipe for throttling the flow of gases therethrough, said throttling means having a bimetallic portion for providing a throttling according to the temperature of the exhaust gases; and control means operatively connected to said throttling means for automatically controlling the latter to provide throttling of the exhaust gases only in a relatively low operating range extending from no load up to a relatively small load which is a fraction of the full load of the engine.

8. In an internal combustion engine, in combination, an exhaust pipe; throttling means located in said exhaust pipe for throttling the flow of exhaust gases therethrough; and electromagnetic means operatively connected to said throttling means for actuating the latter to provide substantial throttling at a load range from no load up to a small load which is a fraction of the full load of the engine and said electromagnetic means also actuating said throttling means to provide substantially no throttling at loads greater than said small load, said electromagnetic means being automatically controlled by a control of the engine which regulates the power output thereof, positively moving said throttling means to a throttling position when the load falls into said range from zero to said small load and positively moving said throttling means to a position providing substantially no throttling when the load increases above said relatively small load, said electromagnetic means including substantially identical structures for positively moving said throttling means to the throttling position thereof or to the non-throttling position thereof and said identical structures cooperating with a permanent magnet carried directly by said throttling means and including excitable coils which cooperate with said permanent magnet according to the direction of flow of current therethrough for attracting said throttling means to one of its positions or for repelling said throttling means to the other of its positions.

9. In an internal combustion engine, an exhaust pipe; throttling means located in said exhaust pipe for throttling the flow of exhaust gases therethrough, said throttling means comprising a throttling member positioned to be subjected to pressure of exhaust gases whereby such pressure tends to move said throttling member to an open position; suction conduit means, and an operative connection between said suction conduit means and said throttling member and arranged to urge said throttling member toward a closed position with a force which increases in response to increasing suction in said conduit means.

10. A structure as set forth in claim 9, wherein said operative connection comprises resilient means.

11. In an internal combustion engine, an exhaust pipe; throttling means provided in said pipe; a suction conduit; and an operative connection between said conduit and said throttling means for regulating the throttling action in dependency on the extent of suction in said conduit during idling and during relatively low load operation of the engine so that such throttling action is a function of said suction, said operative connection comprising resilient means for transmitting motion to said throttling means.

References Cited by the Examiner

UNITED STATES PATENTS

| | | | |
|---|---|---|---|
| 1,675,623 | 7/1928 | Taub | 123—119 |
| 1,706,861 | 3/1929 | Pokorny. | |
| 2,124,081 | 7/1938 | Rauen et al. | 123—97 |
| 2,168,232 | 8/1939 | Messinger | 123—97 |
| 2,220,686 | 11/1940 | Oberhollenzer | 123—97 |
| 2,281,509 | 4/1942 | Mallory. | |
| 2,700,967 | 2/1955 | Maker | 123—119 |
| 2,753,147 | 7/1956 | Welge | 123—97 X |
| 2,805,656 | 9/1957 | Williams | 123—97 |
| 2,924,205 | 2/1960 | Williams | 123—97 |
| 3,043,095 | 7/1962 | Sturtz | 60—29 |
| 3,116,725 | 1/1964 | Hadley | 123—97 X |

MARK NEWMAN, *Primary Examiner.*

FRED E. ENGELTHALER, RICHARD B. WILKINSON, *Examiners.*

LAURENCE M. GOODRIDGE, A. L. SMITH, *Assistant Examiners.*